United States Patent [19]
Wong et al.

[11] Patent Number: 5,918,206
[45] Date of Patent: Jun. 29, 1999

[54] AUDIBLY OUTPUTTING MULTI-BYTE CHARACTERS TO A VISUALLY-IMPAIRED USER

[75] Inventors: Peter Kam-Ho Wong, Mercer Island; Jeffrey M. Witt, Bellevue, both of Wash.

[73] Assignee: Microsoft Corporation, Redmond, Wash.

[21] Appl. No.: 08/758,663

[22] Filed: Dec. 2, 1996

[51] Int. Cl.[6] .................................. G10L 5/00; G10L 5/02
[52] U.S. Cl. ............................................................ 704/271
[58] Field of Search ................................... 704/257–260, 704/235; 379/100.13

[56] References Cited

U.S. PATENT DOCUMENTS

| | | | |
|---|---|---|---|
| 5,396,577 | 3/1995 | Oikawa et al. | 704/260 |
| 5,677,993 | 10/1997 | Ohga et al. | 704/257 |
| 5,748,715 | 5/1998 | Shinagawa et al. | 379/100.13 |
| 5,758,320 | 5/1998 | Asano | 704/258 |

OTHER PUBLICATIONS

*Mathews' Chinese–English Dictionary*, Revised American Edition, Harvard University Press, Cambridge Mass., 1963, pp. VI–XXIII.

*Primary Examiner*—David D. Knepper
*Attorney, Agent, or Firm*—Seed and Berry LLP

[57] ABSTRACT

An audible-output system disambiguates the phonetic sounds of multi-byte characters so that a visually-impaired user can uniquely identify which characters are associated with the output. The audible-output system provides this disambiguation through the use of a secondary audio channel that simultaneously outputs one or more sounds that distinguishes a character being output on a primary audio channel. That is, the phonetics of a character are audibly output on the primary channel, and the distinguishing sound is simultaneously output on a secondary channel. The combination of the two sounds on the two channels unambiguously identifies the character being output to the listener. In effect, this system brings the distinctness of shape to a visually-impaired listener and reinforces the differences in meaning between similar-sounding characters to the listener.

41 Claims, 10 Drawing Sheets

| character | phonic | meaning | radical | phonic | meaning |
|---|---|---|---|---|---|
|  102 / 106 / 104 | ch'i2 | ride |  104 | ma3 | horse |
|  108 / 112 / 110 | ch'ian2 | money |  110 | chin | gold, metal |
|  114 / 116 / 118 / 120 | shu4 | tree |  116 | mu4 | wood |

*Fig. 1*
*(Prior Art)*

| 耒而老羽羊网缶糸米竹　立穴禾内示石矢矛目 |
| --- |
| 126　　　　　　　　　　　　　　　　　108 |

| 両衣行血虫广艸色艮舟舛舌臼至自臣肉聿耳 |
| --- |
| 145　　　　　　　　　　　　　　　　　127 |

| 里釆酉邑辵辰辛車身足走赤貝豸豕豆谷言角見 |
| --- |
| 165　　　　　　　　　　　　　　　　　146 |

| 飛風頁音韭韋革面　非青雨隹隶阜門長金 |
| --- |
| 182　　　　　　　　　　　　　　　　　166 |

| 麻麥鹿鹵鳥魚　鬼鬯鬥髟高骨馬　香首食 |
| --- |
| 198　　　　　　　　　　　　　　　　　187 |

| 龜龍　齒　齊鼻　鼠鼓鼎黽　黑黍黃 |
| --- |
| 210　　　　　　　　　　　　　　　　　199 |

| Character | Meaning | Phrase's Phonics | Characters | Secondary Channel Scheme 2 | Secondary Channel Scheme 3 |
|---|---|---|---|---|---|
| 嗜 416 | interest | shih4 hao4 | (嗜 好) | Radical | Radical 470 |
| 噬 494 | bite | shih4 yao3 | (噬 咬) | Phrase in exception voice | Bite of an apple 478 |
| 仕 490 | beautiful women | shih4 nu"3 | (仕 女) | Radical | Radical 472 |
| 使 496 | a military mission | shih4 ming4 | (使 命) | Phrase in exception voice | Bang |
| 侍 498 | a waiter | shi4 che3 | (侍 者) | Phrase in exception voice | Silverware dropping 480 |
| 試 430 | a test | k'ao3 shih4 | (考 試) | Radical | Radical 474 |
| 誓 432 | a solemn pledge | shih4 yen2 | (誓 言) | Phrase in exception voice | Beat of a drum |
| 諡 434 | confer posthumous title | shih4 fa3 | (諡 法) | Phrase in exception voice | Sound of someone dying |
| 諟 436 | yes or no | shih4 fou3 | (諟 否) | Phrase in exception voice | Voice of old man |
| 識 438 | knowledge | chih shih4 | (知 識) | Phrase in exception voice | ah-ha |
| 逝 440 | to pass away | shih4 shih4 | (逝 世) | Radical | Radical 476 |
| 適 442 | suitable | shih4 ho2 | (適 合) | Phrase in exception voice | Finger snapping |

DATABASE 516

| CHARACTER CODE (602) | CHARACTER PROPERTIES (604) | PHRASE CHARACTER CODES ADDITIONAL CHARACTER (606) | MAIN RADICAL PHONETICS (608) | SIMILAR SOUNDING CHARACTERS WITH SAME MAIN RADICAL (611) |
|---|---|---|---|---|
| 123 (601) | Ch'i2 | 456 | Ma3 | YES - MOST COMMON (609) |
| 124 (607) | Shu4 | 489 | Mu4 | NO |
| ... | | | | |

Fig. 6B

SOUND MAPPING TABLE 520 (612)

| PHONETIC (610) | SOUND DATA |
|---|---|
| ch | PTR TO DATA |
| i | PTR TO DATA |
| m | PTR TO DATA |
| sh | PTR TO DATA |
| u | PTR TO DATA |
| ... | |

Fig. 6C

RICH SOUND TABLE 521

| CHARACTER CODE (620) | RICH SOUND FOR CHARACTER (622) | RICH SOUND FOR MAIN RADICAL (624) |
|---|---|---|
| 123 | PTR TO DATA | PTR TO DATA |
| 124 | PTR TO DATA | PTR TO DATA |
| ... | | |

AUDIBLY OUTPUTTING MULTI-BYTE CHARACTERS TO A VISUALLY-IMPAIRED USER

TECHNICAL FIELD

The present invention relates generally to data processing systems and, more particularly, to outputting multi-byte characters to a visually-impaired user.

BACKGROUND OF THE INVENTION

Nonsighted or visually-impaired people have had difficulty in being integrated into the workforce due in part to the difficulty of working with computers to perform such tasks as word processing. In order to integrate visually-impaired people into the workforce, systems have been developed that audibly output data to the user. In these systems, a computer stores data in a file, and the user can instruct the computer to audibly output the data on a speaker so that the user may listen to the data. Such audible-output systems are difficult for users to use when listening to data of a multi-byte language. A "multi-byte language" is a language in which more than one byte is needed to uniquely identify each character of the language. In other words, there are more than $2^8$ (or 256) characters in the language. The characters of a multi-byte language are referred to as multi-byte characters. Multi-byte languages, such as Kanji-based languages like Chinese, Japanese and Korean, have approximately 40,000 characters.

In Kanji-based languages, the elements of grammar are known as "Kanji characters." The phrase "elements of grammar" refers to units of a given natural language that are capable of comprising parts of speech. For example, the elements of grammar in the English language are words. As such, each Kanji character is a higher-order linguistic symbol that is analogous to a word in the English language. That is, natural languages tend to have three levels of linguistic elements. The lowest of these levels depends on the specific alphabet used and is associated with the sounds of the spoken language. For example, the first and lowest level of linguistic elements in the English language comprises letters. The third level of linguistic elements is the highest level and contains those linguistic elements conveying full creative expression. In the English language, the third level comprises sentences. It is the second level of linguistic elements to which the phrase "elements of grammar" refers. The second level is an intermediate level of linguistic elements, and in the English language, the second level comprises words. In Chinese, the second level comprises Kanji characters.

Figure 1:
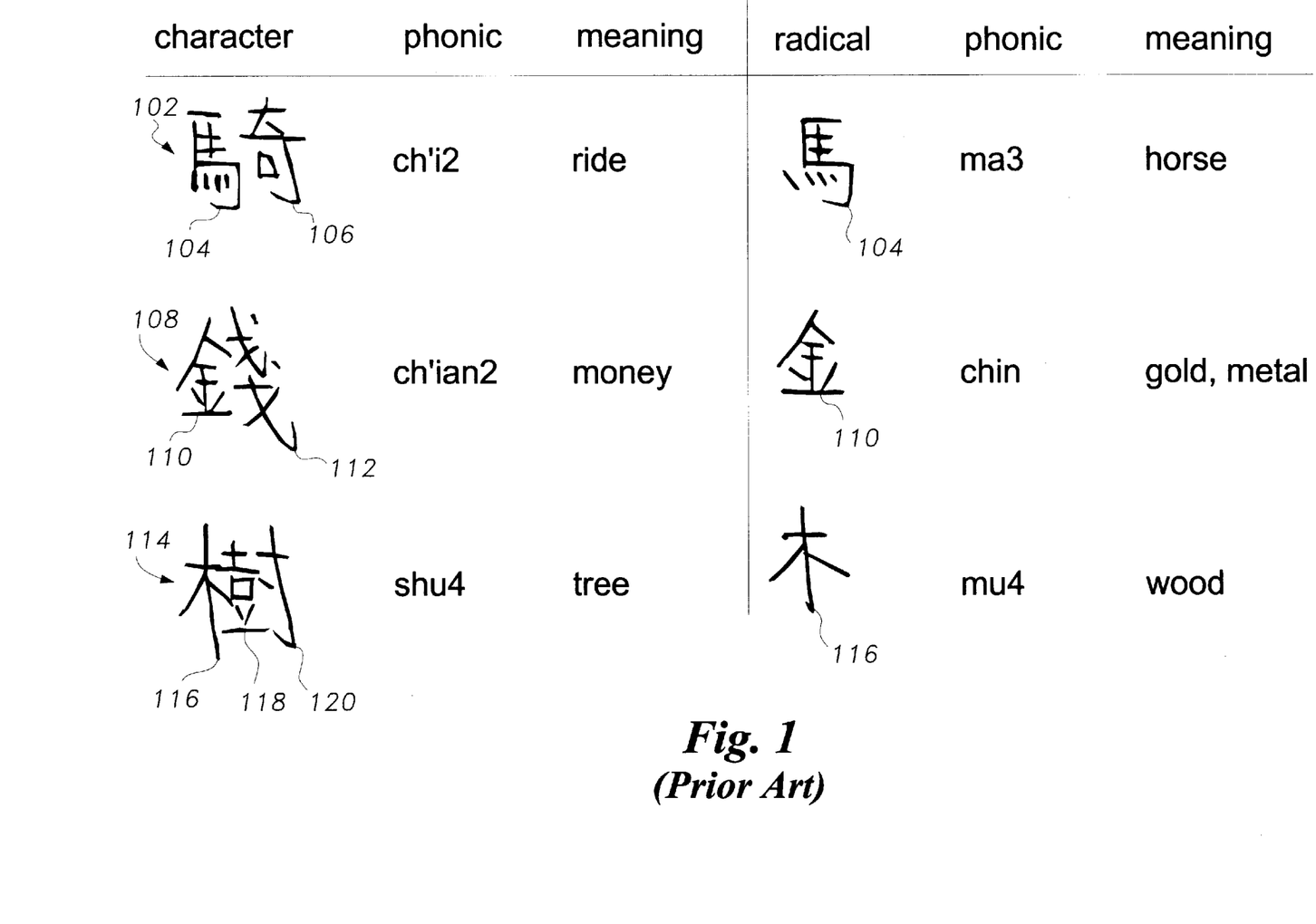
FIG. 1 depicts three Chinese characters and their component radicals.

Kanji characters typically comprise one or more radicals. A "radical" is a part of a Kanji character, much like letters are a part of a word. Oftentimes, a radical is itself a Kanji character. For example, FIG. 1 depicts a Kanji character 102, which means "ride," that comprises two radicals 104 and 106. Similarly, character 108, which means "money," comprises two radicals 110, 112, and character 114, which means "tree," comprises three radicals 116, 118, and 120. Of the radicals that form a character, one of the radicals is usually identified as being the primary or main radical. The main radical is usually the left-most radical in the character. However, if the radicals are situated such that one radical is above another radical, it is usually the upper radical that is the primary or main radical. Also, when a character is formed from two radicals where one radical surrounds another radical, it is the surrounding radical that is the main or primary radical. For example, the main radical for character 102 is radical 104, which means "horse." The main radical for character 108 is radical 110, which means "gold" or "metal," and the main radical for character 114 is radical 116, which means "wood." As can be seen from FIG. 1, the main radical of a character has a close relationship to the meaning of the character.

Figure 2A:
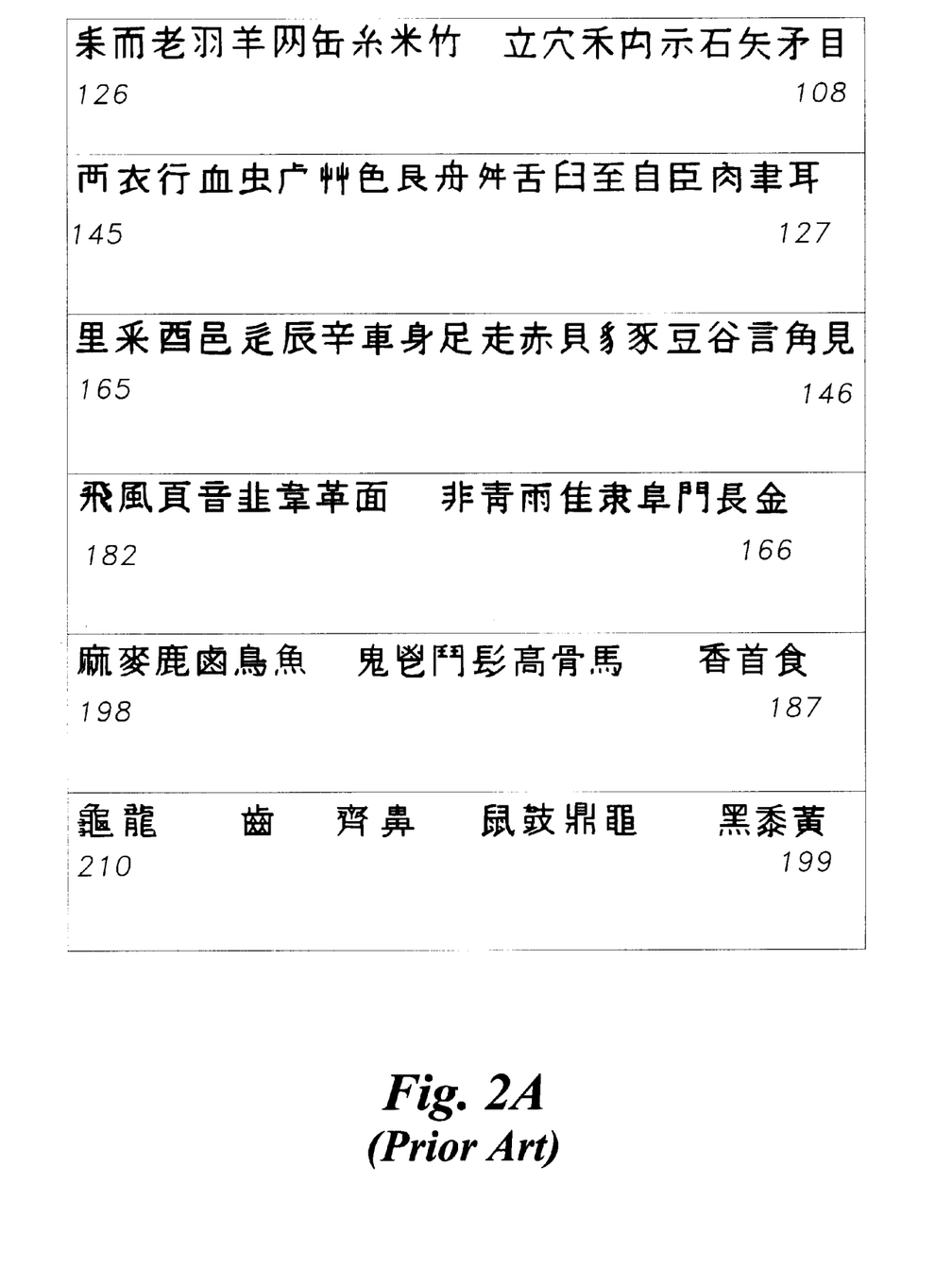
FIGS. 2A–2B depict the radicals utilized in the Chinese language.
Figure 2B:
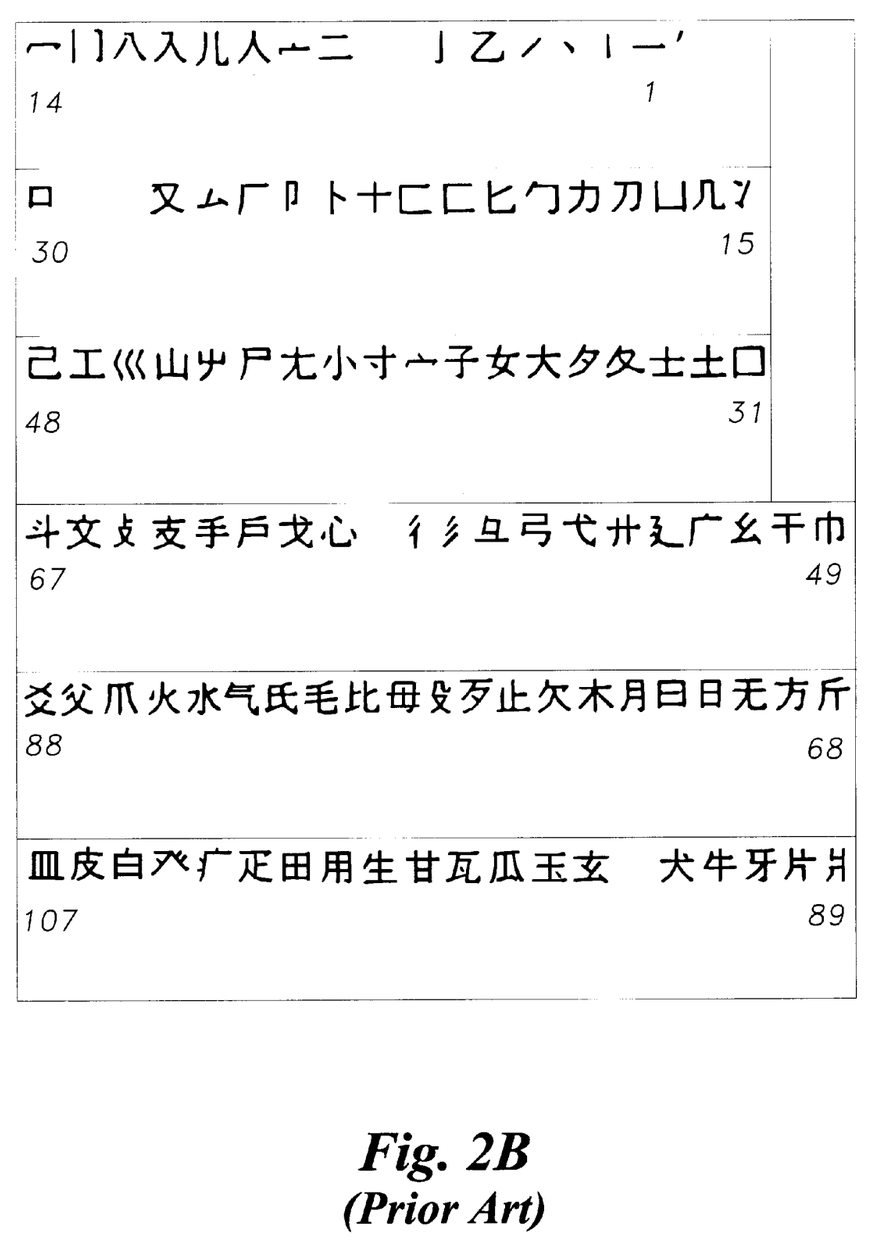

In Kanji-based languages, there are approximately 210 radicals that are used to express all the elements of grammar or characters of the multi-byte language. FIGS. 2A–2B depict a table of most of the radicals used in the Chinese language numbered from 1 to 210.

In order to facilitate the use of Chinese by English-speaking people, a well-known Chinese transliteration system, known as the "Wade-Giles system," is used to map the Kanji characters and radicals onto an English-like indication of their phonetics. For example, with reference to FIG. 1, the phonetics for character 114 are "shu4." This represents that the consonant sound "sh" is combined with the vowel sound "u as in you." The number "4" indicates the specific tone that should be used with the phonetics, such as a rising tone that is commonly associated when the speaker is asking a question. Using the Wade-Giles system, people who do not understand Chinese can phonetically sound out the language.

Because there are approximately 40,000 Kanji characters in Kanji-based languages, many groups of characters sound alike, but have completely different meanings. The characters sound alike because they have the same phonetics. For example, the following Chinese characters all sound like "wong," but each character has a different meaning:

黃 王 皇 蝗 徨

Because many characters sound alike in multi-byte languages, when an audible-output system outputs multi-byte characters to a visually-impaired user, there is an inherent problem of ambiguity because the phonetics or sounds do not uniquely identify one character, but instead map onto a number of characters. Thus, the user oftentimes may not completely understand which characters are identified by the audio output, and consequently, the user has a difficult time understanding the meaning of the audio output. When the data is part of a rather short phrase and the user cannot determine the meaning of the character from the context of the phrase, the meaning of the audio output is even more difficult to derive. Such short phrases are often found in computer commands and are often encountered by a user when interacting with the computer. Thus, ambiguities inherent in multi-byte languages prevent visually-impaired users from using a computer to become integrated in the workforce. Sighted users do not have such a problem because each character has a different pictorial representation, and therefore, the user can identify the specific character, and hence the meaning of the specific character, from its pictorial representation. The sighted user can remember thousands of character variations because they see the characters on a day-to-day basis which helps reinforce character differences and their meaning to the sighted user. However, this visual reinforcement is not available to a visually-impaired user. It is desirable to improve multi-byte character output systems for the visually impaired so that the visually impaired can be better integrated into the work force.

SUMMARY OF THE INVENTION

An improved audible-output system is provided that disambiguates the phonetic sounds of multi-byte characters so that a visually-impaired user can uniquely identify which characters are associated with the output. The improved audible-output system provides this disambiguation through the use of a secondary audio channel that simultaneously outputs one or more sounds that distinguishes a character being output on a primary audio channel. That is, the phonetics of a character are audibly output on the primary channel, and the distinguishing sound is simultaneously output on a secondary channel. The combination of the two sounds on the two channels unambiguously identifies the character being output to the listener. In effect, this system brings the uniqueness or distinctness of shape to a visually-impaired listener and reinforces the differences in meaning between similar-sounding characters to the listener.

In accordance with a first aspect of the present invention, a method for unambiguously outputting sound via a plurality of audio channels to a user of a device is provided. The method outputs on a first audio channel a primary sound attempting to convey a single meaning to the user where the primary sound is associated with a plurality of meanings. At substantially a same time as the primary sound is output, the method outputs a secondary sound on a second audio channel to disambiguate the primary sound to enable the user to identify the single meaning.

In accordance with a second aspect of the present invention, a method is provided in a computer system for audibly playing elements of grammar of a language contained in a file. The method reads the file to obtain the elements of grammar where each element of grammar has a meaning. The method also audibly plays sounds descriptive of the meanings of the elements of grammar where the sounds do not convey visual characteristics of the elements of grammar and do not convey audible characteristics of the elements of grammar.

In accordance with a third aspect of the present invention, a computer for outputting multi-byte characters is provided. The computer comprises a sound subsystem, a secondary storage, and a memory. The sound subsystem audibly plays sounds on a primary channel and a secondary channel. The secondary storage device contains a mapping of multi-byte characters onto phonetics. The phonetics correspond to one multi-byte character representing sounds made when the multi-byte character is spoken. A plurality of the multi-byte characters are ambiguous characters such that the phonetics for the ambiguous characters are equivalent. The memory contains a reader program that reads the file to retrieve a selected one of the ambiguous characters. The reader program also access the mapping to obtain the phonetics for the selected ambiguous character, audibly plays the phonetics of the selected ambiguous character on the primary channel of the sound subsystem, and audibly plays a disambiguating sound on the secondary channel to identify which among the ambiguous characters is the selected ambiguous character.

DETAILED DESCRIPTION OF THE INVENTION

An improved audible-output system is provided that disambiguates the phonetic sounds of multi-byte characters so that a visually-impaired user can uniquely identify which characters are associated with the output. A preferred embodiment of the present invention provides this disambiguation through the use of a secondary audio channel that simultaneously outputs one or more sounds that distinguishes a character being output on a primary audio channel. That is, the phonetics of a character are audibly output on the primary channel, and the distinguishing sound is simultaneously output on a secondary channel. The combination of the two sounds on the two channels unambiguously identifies the character being output to the listener. In effect, this system brings the distinctness of shape to a visually-impaired listener and reinforces the differences in meaning between similar-sounding characters to the listener.

Overview

The improved audible-output system utilizes two audio channels, a primary channel and a secondary channel, to unambiguously audibly output Chinese characters to a visually-impaired user. The primary channel audibly outputs the phonetics for a character, and the secondary channel outputs one or more sounds that disambiguates the character being played on the primary channel. A preferred embodiment has three schemes (disambiguation schemes) for using the secondary audio channel to accomplish the goal of disambiguating phonetic output of multi-byte characters to a listener. One skilled in the art will appreciate, however, that numerous other schemes can be used as part of the present invention.

Figure 3A:
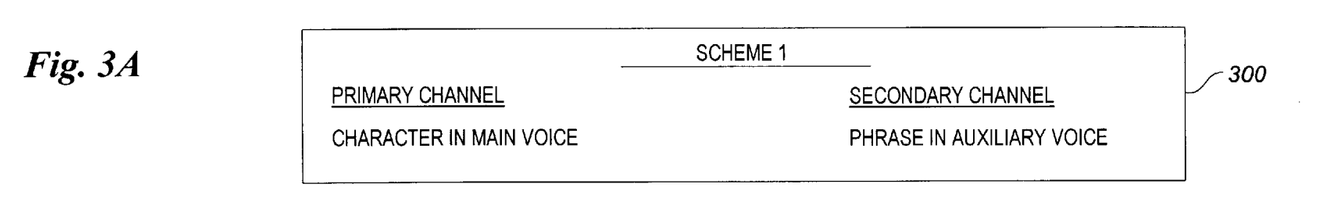
FIGS. 3A–3C depict an overview of the three disambiguation schemes utilized by a preferred embodiment of the present invention.
Figure 3B:
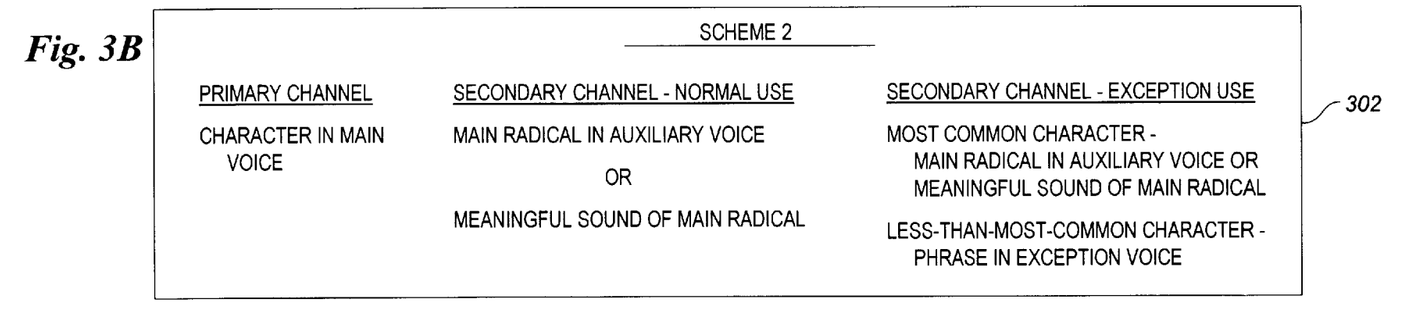
Figure 3C:
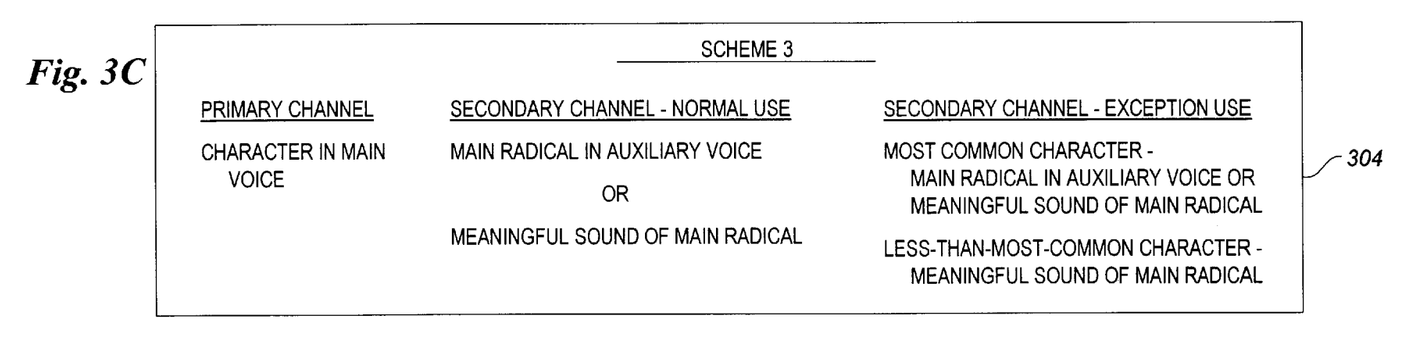

FIGS. 3A–3C depict an overview of the three disambiguation schemes utilized by a preferred embodiment. As depicted in table 300, the first disambiguation scheme phonetically plays a character in a main voice on the primary channel and phonetically plays a phrase using the character on the secondary channel in an auxiliary voice. The phrase "phonetically plays" refers to the system outputting the phonetic sounds of a radical, a character, a phrase or other linguistic element as if the linguistic element were being spoken by a human speaker. The audible-output system utilizes three distinct output voices to disambiguate phonetic output: a main voice, an auxiliary voice, and an exception voice. For example, the main voice, associated with the primary channel, may be a woman's voice, the auxiliary voice may be a man's voice and, as described below, in certain situations when an exception voice is needed, a lower-pitched man's voice may be used. By using multiple voices, the listener can derive additional meaning from the audible output. For example, the listener may know that the character is always spoken in a woman's voice and additional information is provided in a man's voice to disambiguate the character. The output voices are configurable by the user such that the user can change the sex and pitch of any of the output voices. One skilled in the art will appreciate that many different combinations of sex and pitch for the output voices can be utilized as part of the present invention. Additionally, one skilled in the art will appreciate that other qualities of the output voices can be manipulated by the present invention. For example, an output voice, when played on a speaker, may appear to move or it may appear to be close or far. The manipulation of such qualities will also serve to provide additional meaning to the user.

As stated above, the first disambiguation scheme phonetically plays a phrase on the secondary audio channel to disambiguate the character being phonetically played on the primary audio channel. In this sense, a "phrase" is a usage of the character in a two-character phrase that enables a listener to distinguish the character played on the primary channel by using the context in which the character is used in the phrase. Since the playing of a multi-character phrase on the secondary audio channel at the same time that the primary audio channel is playing a single character slows down the primary channel, an alternative of the first disambiguation scheme is to play on the secondary audio channel only the additional character in the phrase other than the character being played on the primary channel. In this manner, the alternative to the first disambiguation scheme will speed up the output process.

As shown in table 302, the second disambiguation scheme phonetically plays the character on the primary channel in the main voice, and under normal circumstances, phonetically plays the main radical of the character on the secondary channel in the auxiliary voice. The secondary channel also has certain exceptional uses, which are described below. Using the main radical to disambiguate a character is a natural way of distinguishing the character, because the main radical is closely related to the meaning of the character as can be seen from the example characters and main radicals of FIG. 1. Another benefit of using the main radical to disambiguate a character is that the listener is able to identify characters having a similar radical (or common root) which nonsighted listeners are unable to do from the phonetics alone. This ability to identify common roots among characters provides nonsighted listeners with a better appreciation and understanding of the language. In an alternative to the second disambiguation scheme, under normal circumstances, the secondary channel may play a meaningful sound that is associated with the meaning of the main radical. A "meaningful sound" is a sound associated with the main radical that conveys the meaning of the radical, but not descriptive of the pictorial representation or pronunciation of the radical. As an example, for the wood radical 116 of FIG. 1, the sound of knocking on wood may be played to convey a meaningful sound to the listener.

As previously stated, in addition to the normal use of the secondary channel, the secondary channel has a different use in exceptional circumstances. Since the second disambiguation scheme provides a disambiguating sound that is associated with the main radical, there are some circumstances, exceptional circumstances, under which the disambiguating sound alone is insufficient to disambiguate the character played on the primary channel. These circumstances occur when multiple characters sound alike and the multiple characters also have the same main radical, which is further discussed below. In these situations, phonetically playing the characters and phonetically playing the main radical produces the exact same sounds for each of the multiple characters and does not allow the user to distinguish between the multiple characters. The second disambiguation scheme handles these exceptional circumstances by playing a sound on the secondary channel that will differentiate the characters. For the most-common character among multiple, similar-sounding characters that have the same main radical, the main radical is phonetically played in the auxiliary voice. The commonality of the characters is determined by how often they are usually used in the language (i.e., Chinese). Alternatively, for the most common character, a meaningful sound of the main radical may be played. In contrast, for the less-than-most-common characters, the second disambiguation scheme phonetically plays a phrase in an exception voice on the secondary channel so that the user can identify the character output on the primary channel from the context of the phrase. As stated above, the exception voice is distinct from both the auxiliary voice and the main voice so that the listener knows of the exceptional circumstances.

The third disambiguation scheme, depicted in Table 404, is very similar to the second disambiguation scheme in that the primary channel phonetically plays the character in the main voice, and the secondary channel, under normal circumstances, either phonetically plays the main radical in the auxiliary voice or a meaningful sound of the main radical. Also, the third disambiguation scheme phonetically plays the main radical in the auxiliary voice (or a meaningful sound of the main radical) for the most-common character among multiple similar-sounding characters having the same main radical. The second and third disambiguation schemes differ, however, in the way that exceptional circumstances are handled for the less-than-most-common characters. For the less-than-most-common characters, the secondary channel will play a meaningful sound associated with either the character or a well-known phrase in which the character is used. For example, with respect to character 114 of FIG. 1, the meaningful sound may be that of a tree being cut down or the sound of the wind blowing through the leaves of a tree. As another example, for character 108 of FIG. 1, the third disambiguation scheme may play the sound of coins falling and hitting the floor. One alternative to the third disambiguation scheme is to play the meaningful sound of the character or phrase on the secondary channel in every circumstance (i.e., for both the normal and exceptional circumstances).

Examples of the Disambiguation Schemes

Figure 4:
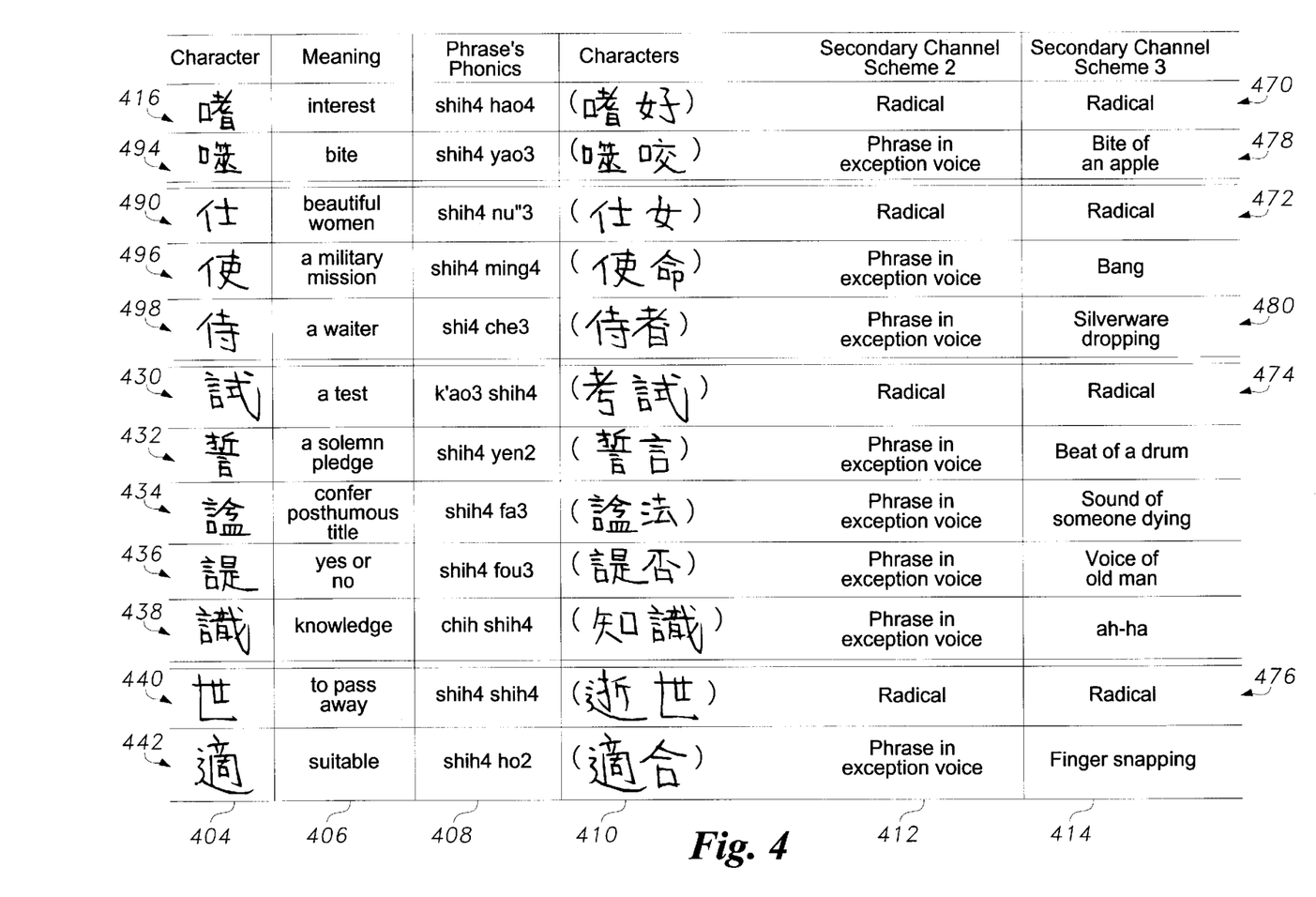
FIG. 4 depicts examples of the three disambiguation schemes of a preferred embodiment of the present invention.

FIG. 4 depicts an example of the three disambiguation schemes as utilized with the "shih4" Wade-Giles phonetics. These particular phonetics map onto 39 different characters. For all three disambiguation schemes, the primary audio channel phonetically plays the character (i.e., shih4). The examples described below are focused on the output of the secondary audio channel. In order to disambiguate the character being output from among the 39 possible characters, some of which are depicted in column 404, the first disambiguation scheme outputs various two-character phrases 410 that are associated with each of the characters. These phrases 410 provide an example usage of the character so that the listener can identify the character played on the primary audio channel from the context of the phrase. Using a phrase to disambiguate a character is important because oftentimes an individual character by itself does not have a recognizable meaning to colloquial speakers absent its context in a phrase. For example, character 416 is a fairly unrecognizable character by itself which does not have an independent meaning to many people outside of its use in a phrase. Thus, disambiguating the character does little to convey meaning to the listener. However, when used in a well-known phrase, such as phrase 418 which means "interest," the user can unambiguously identify the character in a meaningful way from the context of the phrase. When phonetically playing one of the characters (e.g., 416) on the primary channel in the main voice, the first disambiguation scheme simultaneously phonetically plays a corresponding phrase (e.g., 418) on the secondary channel to disambiguate the character.

As stated above, when phonetically playing a character on the primary channel, the second disambiguation scheme phonetically plays the main radical on the secondary channel to disambiguate the character. However, sometimes multiple similar-sounding characters have a common main radical and, in these circumstances, phonetically playing the main radical on the secondary channel does little to distinguish the character played on the primary channel from the other similar-sounding characters. In these circumstances, the second disambiguation scheme phonetically plays a phrase on the secondary channel to disambiguate the character played on the primary channel. FIG. 4 contains a number of examples of similar-sounding characters that have the same main radical. For example, characters 416 and 424 share the same main radical, k'ou3, which means "mouth." Characters 420, 426 and 428 share the same main radical, jen2, which means "people." Characters 430, 432, 434, 436 and 438 share the same main radical, yen2, which means "word," and characters 440 and 442 share the same main radical, ch'o4, which means "moving." As can be seen in column 412, the second disambiguation scheme phonetically plays the main radical (e.g., 444) on the secondary channel for the most common of the characters 416, 420, 430, 440 that share the same radical. However, for the less-than-most-common characters 424, 426, 428, 432, 434, 436, 438, 442 that share the same radical, the second disambiguation scheme phonetically plays the associated phrase (e.g., 446) in column 410 in the exception voice on the secondary channel.

As stated above, the third disambiguation scheme phonetically plays a character on the primary channel and phonetically plays the main radical of the character on the secondary channel. However, in exceptional circumstances, the third disambiguation scheme plays a meaningful sound for a phrase that uses the character. Column 414 depicts exemplary output on the secondary channel when using the third disambiguation scheme. As in the second disambiguation scheme, when multiple similar-sounding characters share the same main radical, the third disambiguation scheme phonetically plays the main radical in the auxiliary voice for the most common of the characters (e.g., 470, 472, 474 and 476). However, for less-than-most-common characters, the third disambiguation scheme plays a meaningful sound on the secondary channel indicating the meaning of a well-known phrase 410 that contains the character. Alternatively, if the character itself has a well-recognized meaning, the meaningful sound may be based on the character's meaning. For example, for character 524, the associated phrase means "bite," and as such, the meaningful sound played by the third disambiguation scheme is that of someone taking a bite out of an apple. As another example, the phrase for character 528 means "waiter," so the meaningful sound output on the secondary channel is the sound made when silverware drops. As a generalization of this technique, where the phrase indicates an object, the third disambiguation scheme plays a sound made by that object. For example, the character or phrase for a train would make a "choo choo" sound, the character or phrase for a car would make a horn-honking sound, and so on.

As an alternative to the third disambiguation scheme, the meaningful sound for the phrase may be output in every circumstance, even in the absence of any sound in the primary channel. Such a system where only a meaningful sound is output, instead of phonetically playing the character, may be advantageous when attempting to convey the meaning of words where the listener does not know the language.

Implementation Details

Figure 5:
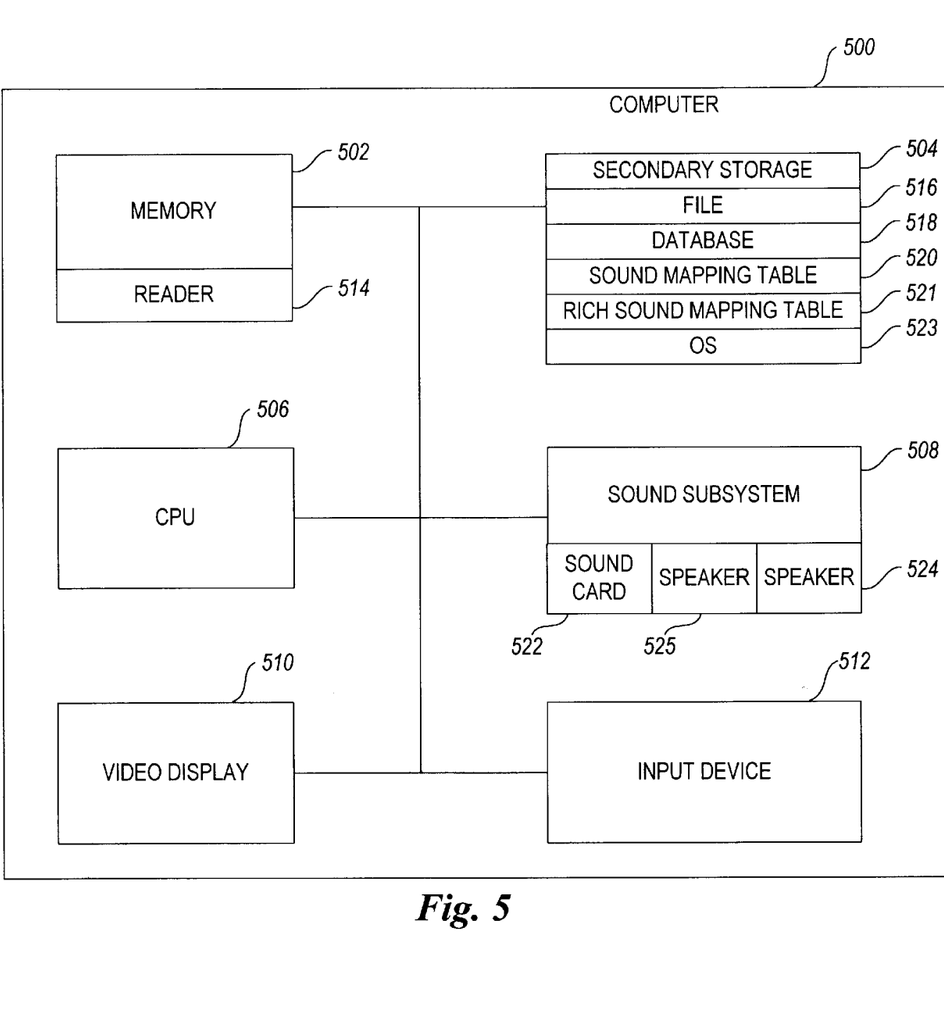
FIG. 5 depicts a computer system that is suitable for practicing a preferred embodiment of the present invention.

FIG. 5 depicts a computer that is suitable for practicing a preferred embodiment of the present invention. The computer 500 contains a memory 502, a secondary storage device 504, a central processing unit (CPU) 506, a sound subsystem 508, a video display 510, and an input device 512. The memory 502 contains a reader program 514 of a preferred embodiment that is responsible for reading a file 516 on the secondary storage device 504, and phonetically playing the data in the file to the user on the sound subsystem 508. The secondary storage device 504 contains the file 516 read by the reader program 514, a database 518 that contains a mapping of character codes for the multi-byte characters onto the phonetics for the characters, a sound mapping table 520 that maps the phonetics onto the sound data that causes the sound subsystem 508 to emit the appropriate sounds, a rich sound table 521 that maps character codes onto meaningful sounds for the characters and main radicals, and an operating system 523, such as the MICROSOFT WINDOWS 95® operating system available from Microsoft Corporation of Redmond, Wash., that manages the sound subsystem 508. The sound subsystem 508 contains a sound card 522 and two speakers 524, 525. The sound card 522 receives data from the reader program 514 via the operating system 523 and plays an appropriate sound on both of the speakers 524, 525. The operating system 523, the sound card 522, and the speakers 524, 525 are capable of playing two audio channels simultaneously. Although a preferred embodiment utilizes two speakers, one for the primary audio channel 524 and one for the secondary audio channel 525, one skilled in the art will appreciate that both audio channels may be played on the same speaker. A preferred embodiment of the present invention can be utilized for proofreading multi-byte characters in the system described in co-pending U.S. patent application Ser. No. 08/758,672, entitled, "Method and System for Unambiguously Inputting Multi-byte Characters Into a Computer From a Braille Input Device," filed on even date herewith and assigned to a common assignee.

Figures 6A, 6B, 6C:
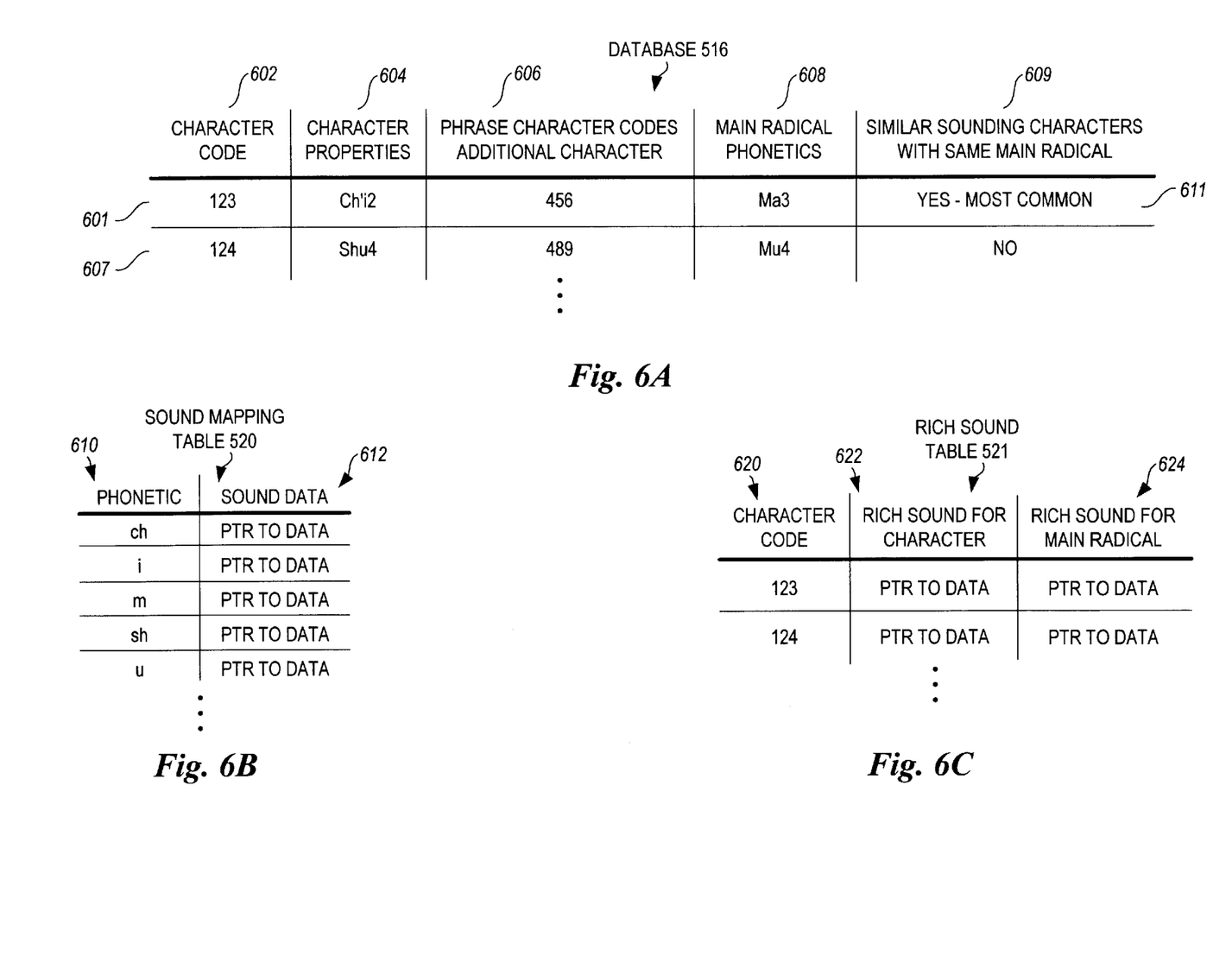
FIG. 6A depicts a more detailed diagram of the database of FIG. 5.
FIG. 6B depicts a more detailed diagram of the sound mapping table of FIG. 5.
FIG. 6C depicts a more detailed diagram of the rich sound table of FIG. 5.

FIG. 6A depicts a more detailed diagram of the database 516. The database 516 contains a number of entries 601 and 603, where each entry contains information for a particular Kanji character. The Kanji character in each entry is represented by a character code 602, such as the Big 5 character code. Each entry 601, 603 contains the phonetics 604 for the associated character 602, a character code for an additional character 606, the phonetics for the main radical 608, and an indication 609 of whether there are other characters that sound like the associated character and that share a common main radical. If there are such other characters, there is also an indication (e.g., 611) of whether the associated character is the most common among the similar-sounding characters with the same main radical. For example, the indication 611 for entry 601 indicates that there are additional similar-sounding characters that share the same main radical and that the associated character is the most common. The character phonetics 604 are the Wade-Giles phonetics that are used for determining the appropriate data to be sent to the sound card so that the appropriate sounds are played on the speakers. Column 606 contains the character code for an additional character that is used as part of a two-character phrase containing the character 602. That is, the phrases used by the reader program (e.g., in the first disambiguation scheme) are two-character phrases in which the character output on the primary channel is one of the characters and there is an additional character combined with it to form a phrase. It is this additional character that is indicated in column 606. Column 608 contains the main radical phonetics for use in the second and the third disambiguation schemes.

FIG. 6B depicts a more detailed diagram of the sound mapping table 520. The sound mapping table 520 contains a number of entries where each entry contains a phonetic 610 and a pointer 612 that refers to sound data for the sound card which causes the sound for the phonetic to be played on the speaker. Off-line, the sound data is stored in "WAV" files. WAV files have a well-known file format for storing sound data so that it can be sent to a sound card and played on a speaker. When the system is off-line, the data is stored in a WAV file; however, at run time, the data is brought into memory and a pointer to the data is stored in column 612. It should be noted that the numbers indicating the tone of the phonetics are not stored in the sound mapping table 520. Instead, when the sound data for a phonetic is being sent to the sound subsystem, the reader program modifies the sound data using well-known techniques to achieve the appropriate tone. Upon receiving the sound data, the sound subsystem will play the appropriate phonetic with the appropriate tone.

FIG. 6C depicts a more detailed diagram of the rich sound table 521. The rich sound table 521 contains a mapping of character codes 620 onto the rich sound to be played for the character 622 in the third disambiguation scheme and the rich sound to be played for the main radical 624 which is used by both the second and third disambiguation schemes.

Figure 7:
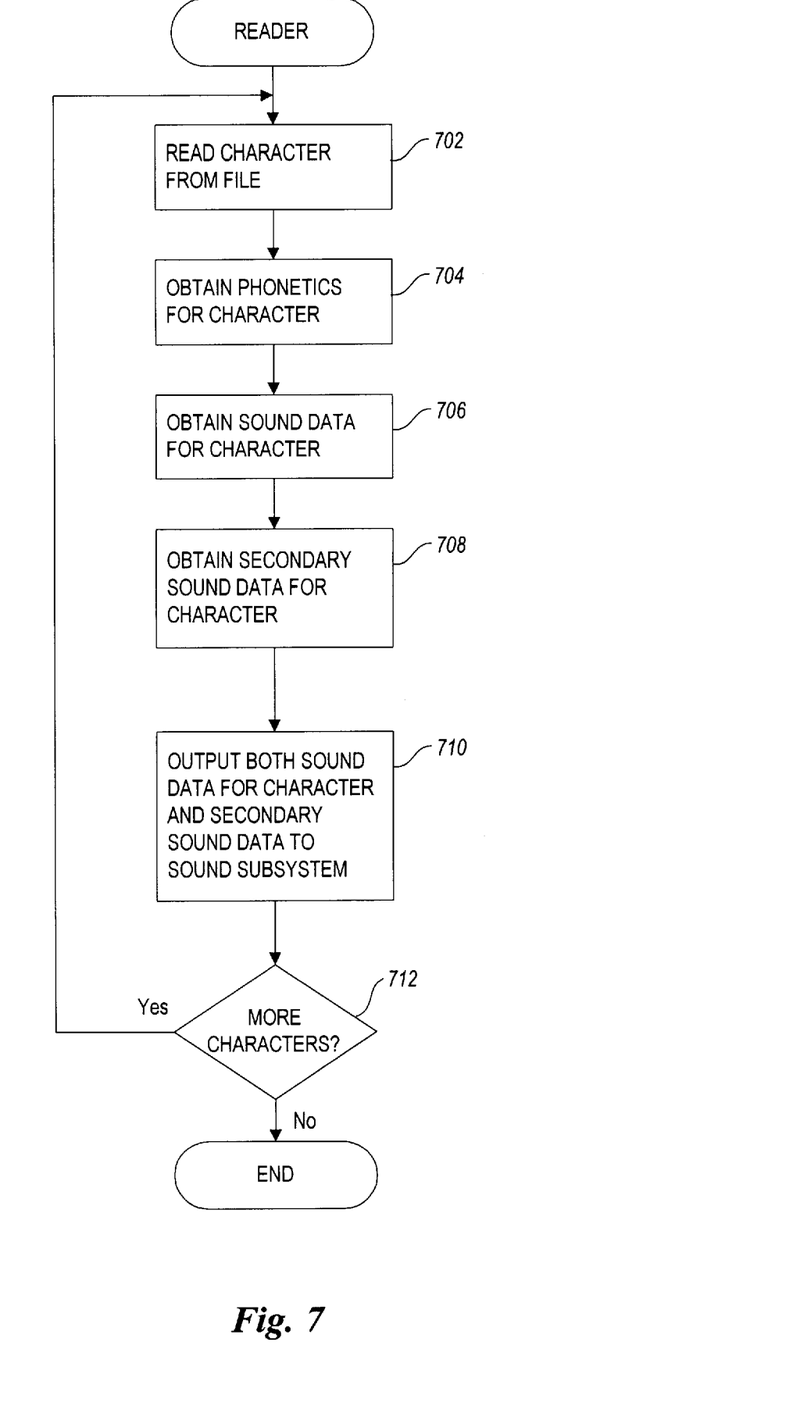
FIG. 7 depicts a flowchart of the steps performed by the reader program depicted in FIG. 5.
Figure 8A:
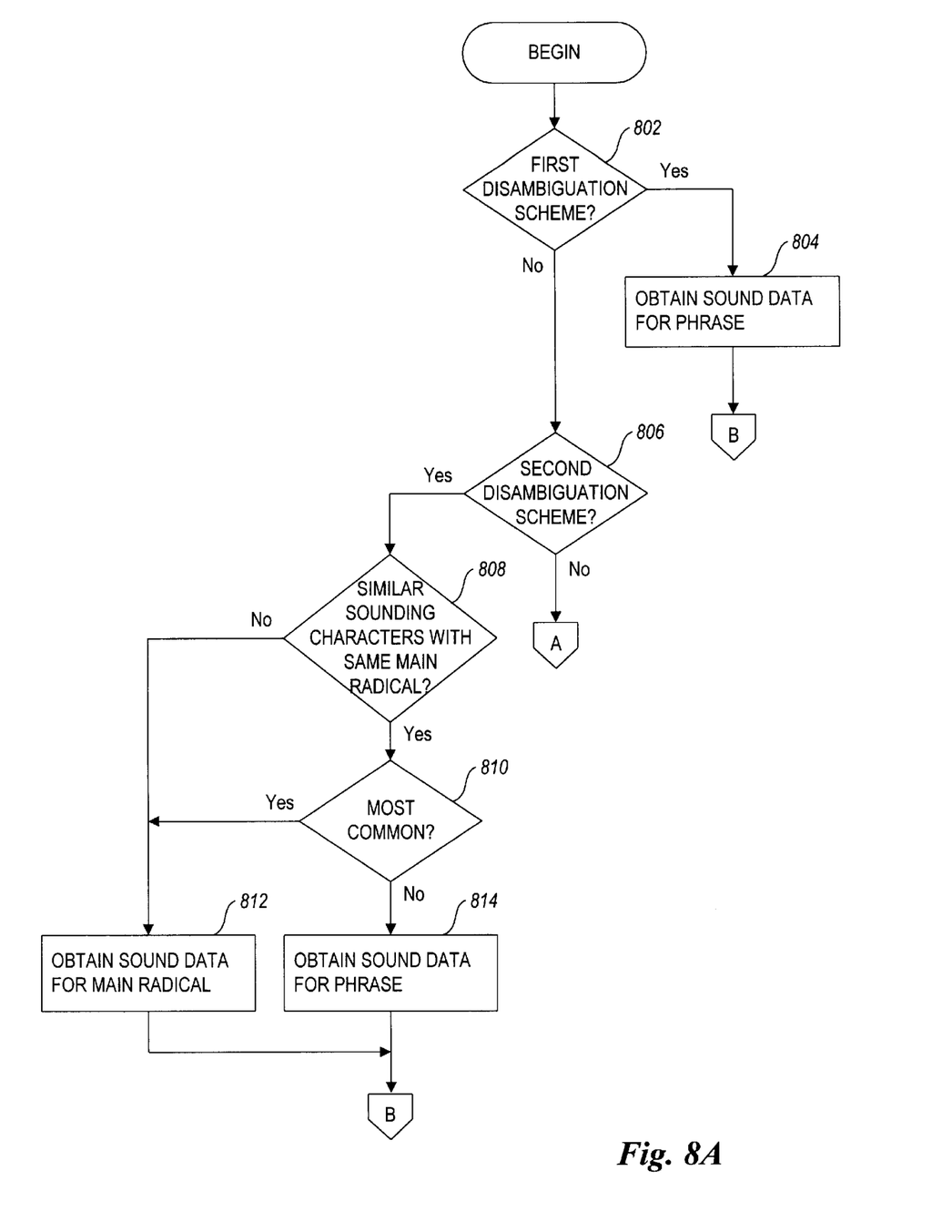
FIGS. 8A and 8B depict a flowchart of the steps performed when obtaining a secondary sound to be played on the secondary audio channel.
Figure 8B:
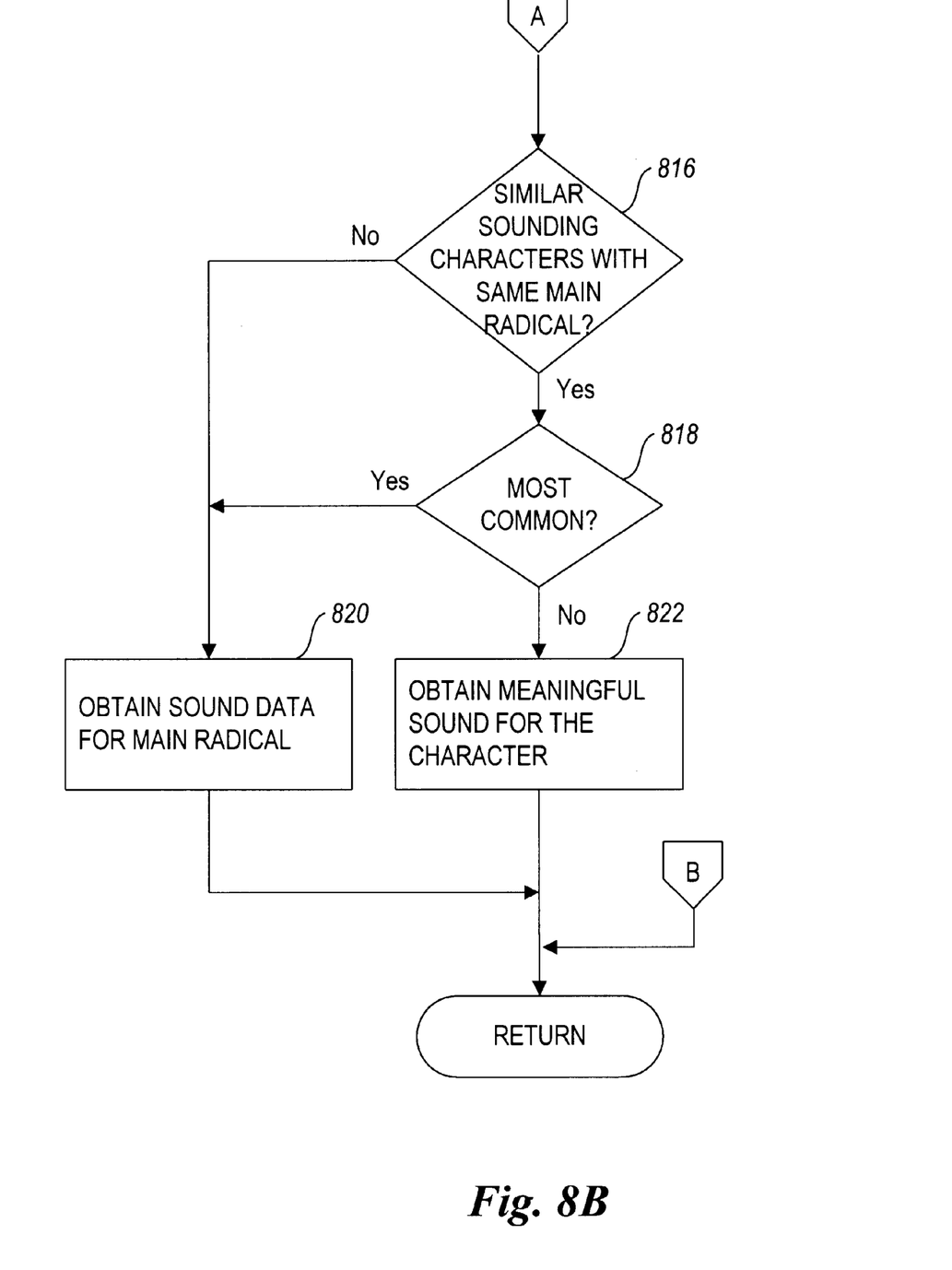

FIG. 7 depicts a flowchart of the steps performed by the reader program. The first step performed by the reader program is to read a character from the file on the secondary storage device (step 702). The file stores the characters as character codes, and as such, in this step, it is one character code that is actually read. After reading a character code, the reader program obtains the phonetics for the character (step 704). The reader program obtains the phonetics for the character by using the character code received in step 702 to index into the database 516 to access the entry for the character in which is stored the phonetics. Next, the reader program obtains the sound data for the phonetics (step 706). The reader program obtains the sound data by mapping the phonetics located in the database entry onto the phonetics in the sound mapping table 520 to obtain the sound data. Next, the reader program obtains secondary sound data for the character (step 708). In this step, the processing is specific to the particular disambiguation scheme being utilized and is described relative to FIG. 8.

The first step performed in obtaining the secondary sound data is to determine whether the first disambiguation scheme is being utilized (step 802). If the first disambiguation scheme is used, the secondary sound data for the character is the sound for the phrase so the reader program accesses the database entry to obtain the character code for the additional character in the phrase and then accesses the database again to obtain the phonetics for the additional character (step 804). After obtaining the phonetics for the additional character, the reader program has both the phonetics for the character from step 704 of FIG. 7 and the phonetics for the additional character. The reader program then accesses the sound mapping table to obtain the sound data for the additional character.

If the second disambiguation scheme is utilized (step 806), the reader program accesses the database to determine whether the character has other similar-sounding characters with the same main radical (step 808). If there are no such other characters, the reader program obtains the secondary sound data for the main radical by accessing the main radical phonetics from the database and accessing the sound mapping table to obtain the sound data for the phonetics of the main radical (step 812). Alternatively, the secondary sound data may be a meaningful sound for the main radical. In this case, the rich sound table is accessed to obtain the secondary sound data. If, however, there are similar-sounding characters with the same main radical, the reader program determines if the character is the most common among the characters (step 810). If the character is the most common, the reader program obtains the sound data for the main radical (step 812). If the character is not the most common, the reader program obtains the sound data for the phrase as described in step 804.

If it is determined that the second disambiguation scheme is not being used (step 806), the reader program knows that the third disambiguation scheme is being used and performs the appropriate processing as reflected by steps 816–822 of FIG. 8B. If the third disambiguation scheme is used, the reader program determines if there are similar-sounding characters with the same main radical (step 816). If there are no such characters, the reader program obtains the sound data for the main radical as described in step 812 (step 820). Alternatively, a meaningful sound for the main radical may be played on the secondary channel. If this alternative is used, the secondary sound data is obtained by accessing the rich sound table. However, if there are similar-sounding characters with the same main radical, the reader program determines if the character is the most common (step 818). If the character is the most common, the reader program obtains the sound data for the main radical (step 820). If the character is not the most common, the reader program accesses the rich sound table with the character code to obtain the sound data for the character (step 822). After performing steps 812, 814, 820, and 822, the secondary sound data has been obtained, and thus, processing returns.

Referring back to FIG. 7, after obtaining the secondary sound data, the reader program outputs the sound data for the character on the primary audio channel of the sound subsystem and outputs the secondary sound data on the secondary audio channel of the sound subsystem by utilizing well-known functionality provided by the operating system (step 710). In outputting the sound data, if the sound data represents phonetics, the reader program will adjust the tone appropriately. Next, the reader program determines if there are more characters to be read (step 712), and if so, processing continues to step 702. If there are no more characters to be read, processing ends.

Alternative Embodiments

The use of the secondary audio channel, as described above, can be used to disambiguate output other than just audio output. In a first alternative embodiment, instead of audibly outputting the multi-byte characters on the primary audio channel, the system outputs the multi-byte characters via a Braille I/O device. Such a suitable Braille I/O device is described in more detail in co-pending U.S. patent application Ser. No. 08/758,672, entitled, "Method And System For Unambiguously Inputting Multi-byte Characters Into A Computer From A Braille Input Device," filed on even date herewith and assigned to a common assignee, which has previously been incorporated by reference. In the first alternative embodiment, the Braille I/O device outputs the multi-byte characters and a speaker outputs the audible output for the secondary audio channel described above using any one of the three disambiguation schemes. This system is advantageous to a visually-impaired user since they do not have to listen to the primary audio channel and the secondary audio channel at the same time. Instead, the user is able to understand the data using two senses: the sense of touch and the sense of hearing. The user feels a multi-byte character on the Braille I/O device, and the user listens to audible output that disambiguates the multi-byte character. By utilizing two senses in this manner, the user is able to better understand the multi-byte character.

A second alternative embodiment displays file 516 on the video display 510 to a sighted user. The reader program 514 highlights each element of grammar in the file 516 one at a time so that the user can visually see the element of grammar. Simultaneously, as each multi-byte character is highlighted, the reader program 514 outputs sounds on a speaker to the user to convey additional meaning of the multi-byte character to the user. The sounds output on the speaker would be those output on the secondary audio channel described above in accordance with any one of the three disambiguation schemes. This system is particularly useful to people with a learning disability who have a difficult time understanding the written language. By conveying sounds to the user via the speaker, the user is able to obtain an understanding of the multi-byte character using two senses: the sense of sight and the sense of hearing. Using two senses will help the user better understand the elements of grammar. Moreover, when the sounds output on the speaker are meaningful sounds of the elements of grammar per the second and third disambiguation schemes described above, the user receives additional information that they can use to better understand the elements of grammar.

While the present invention has been described with reference to a preferred embodiment thereof, those skilled in the art will know of various changes in form and detail that may be made without departing from the spirit and scope of the claimed invention as defined in the appended claims.

We claim:

1. A method for outputting multi-byte characters in a computer system having a speaker, a file containing the multi-byte characters, and a mapping of each multi-byte character onto a primary sound and a secondary sound, comprising the steps of:

accessing the file to retrieve a multi-byte character;

accessing the mapping to obtain a primary sound for the multi-byte character, wherein the primary sound for the multi-byte character is phonetics for the multi-byte character, the phonetics being a sound made when the multi-byte character is spoken, wherein additional multi-byte characters have same phonetics such that the multi-byte character is not uniquely identified by the primary sound alone;

accessing the mapping to obtain a secondary sound for the multi-byte character, wherein the secondary sound conveys a meaning of the multi-byte character to enable the user to distinguish the multi-byte character from the additional multi-byte characters when the user hears both the primary sound and the secondary sound; and outputting the primary sound and the secondary sound on the speaker at substantially a same time to enable the user to identify the multi-byte character.

2. The method of claim 1 wherein the multi-byte character comprises a radical, wherein the secondary sound is a sound made when the radical is spoken.

3. The method of claim 2 wherein the additional multi-byte characters comprise a radical, and wherein the step of accessing the mapping to obtain a secondary sound includes determining whether the radical of at least one of the additional multi-byte characters is equivalent to the radical of the multi-byte character, and when it is determined that the radical of the at least one of the additional multi-byte characters is equivalent to the radical of the multi-byte character, defining the secondary sound such that the secondary sound distinguishes the multi-byte character from the at least one additional multi-byte character.

4. The method of claim 3 wherein the step of defining includes defining the secondary sound to be phonetics of a phrase of multiple multi-byte characters that includes the multi-byte character to enable the user to distinguish the multi-byte character from the at least one additional multi-byte character from context of the phrase.

5. The method of claim 4 wherein the multi-byte characters are part of a language, and wherein the step of defining includes determining whether the multi-byte character is more commonly used in the language than the at least one additional multi-byte character, and when it is determined that the multi-byte character is more commonly used than the at least one additional multi-byte character, defining the secondary sound to be the phonetics of the radical of the multi-byte character.

6. The method of claim 3 wherein the multi-byte character has a meaning, and wherein the step of defining includes defining the secondary sound to be a meaningful sound of the multi-byte character such that the meaningful sound is descriptive of the meaning of the multi-byte character.

7. The method of claim 6 wherein the meaning of the multi-byte character is an object that generates a sound, and wherein the step of defining includes defining the secondary sound to be the sound generated by the object.

8. The method of claim 1 wherein the secondary sound represents a phrase in which the multi-byte character is used to enable the user to identify the multi-byte character from the context of the phrase.

9. A method for unambiguously outputting sound via a plurality of audio channels to a user of a device, comprising the steps of:

outputting on a first audio channel a primary sound attempting to convey a single meaning to the user, the primary sound being associated with a plurality of meanings; and outputting on a second audio channel a secondary sound at substantially a same time as the primary sound is output to disambiguate the primary sound to enable the user to identify the single meaning.

10. The method of claim 9 wherein the primary sound represents phonetics for an element of grammar of a language and wherein the secondary sound is a usage of the element of grammar to allow the user to identify the element of grammar from context of the usage.

11. The method of claim 10 wherein the usage is a phrase containing the element of grammar and at least one additional element of grammar.

12. The method of claim 9 wherein the element of grammar has a root with a meaning and wherein the secondary sound is a sound descriptive of the meaning of the root.

13. The method of claim 9 wherein the primary sound represents phonetics for an element of grammar of a language and wherein the secondary sound is phonetics for a root of the element of grammar.

14. The method of claim 13 wherein the element of grammar is a Kanji character comprising a radical and wherein the secondary sound represents phonetics for the radical.

15. The method of claim 14 wherein the Kanji character comprises a plurality of radicals, one of the radicals being a main radical, and wherein the secondary sound represents phonetics for the main radical.

16. The method of claim 15 wherein the language is Chinese.

17. The method of claim 9 wherein the primary sound reflects phonetics that represent an element of grammar of a language having a meaning and wherein the second sound is a sound descriptive of the meaning of the element of grammar.

18. The method of claim 17 wherein the element of grammar is an object that produces a sound, and wherein the secondary sound is the sound produced by the object.

19. A method in a computer system for audibly playing elements of grammar of a language contained in a file, comprising the steps of:

reading the file to obtain the elements of grammar, each element of grammar having a meaning and a pronunciation; and audibly playing sounds, other than the pronunciations, that are descriptive of the meanings of the elements of grammar, wherein the sounds do not convey visual characteristics of the elements of grammar.

20. A computer for outputting multi-byte characters, comprising:

a sound subsystem for audibly playing sounds on a primary channel and a secondary channel;

a secondary storage device containing a mapping of multi-byte characters onto groups of phonetics, a group of phonetics corresponding to one multi-byte character representing sounds made when the multi-byte character is spoken, a plurality of the multi-byte characters being ambiguous characters such that the group of phonetics for the ambiguous characters are equivalent; and a memory containing a reader program that reads the file to retrieve a selected one of the ambiguous characters, that accesses the mapping to obtain the group of phonetics for the selected ambiguous character, that audibly plays the group of phonetics of the selected ambiguous character on the primary channel of the sound subsystem, and that audibly plays a disambiguating sound on the secondary channel to identify which among the ambiguous characters is the selected ambiguous character.

21. The computer of claim 20 wherein the disambiguating sound is a usage of the selected ambiguous character.

22. The computer of claim 20 wherein the multi-byte characters comprise at least one radical having phonetics, and wherein the disambiguating sound is the phonetics for the radical.

23. The computer of claim 20 wherein the ambiguous multi-byte characters each have a different meaning and wherein the disambiguating sound is descriptive of the meaning of the selected ambiguous character.

24. The computer of claim 20 wherein the multi-byte characters comprise at least one radical with a meaning, and wherein the disambiguating sound conveys the meaning of the radical.

25. The computer of claim 20 wherein the multi-byte characters are Kanji characters.

26. The computer of claim 20 wherein the multi-byte characters are characters of the Chinese language.

27. A computer-readable medium containing instructions for controlling a computer system to output multi-byte characters, the computer system having a speaker, a file containing the multi-byte characters, and a mapping of each multi-byte character onto a primary sound and a secondary sound, by performing the steps of:

accessing the file to retrieve a multi-byte character;

accessing the mapping to obtain a primary sound for the multi-byte character, wherein the primary sound for the multi-byte character is phonetics for the multi-byte character, the phonetics being a sound made when the multi-byte character is spoken, wherein additional multi-byte characters have same phonetics such that the multi-byte character is not uniquely identified by the primary sound alone;

accessing the mapping to obtain a secondary sound for the multi-byte character, wherein the secondary sound conveys a meaning of the multi-byte character to enable the user to distinguish the multi-byte character from the additional multi-byte characters when the user hears both the primary sound and the secondary sound; and outputting the primary sound and the secondary sound on the speaker at substantially a same time to enable the user to identify the multi-byte character.

28. The computer-readable medium of claim 27 wherein the multi-byte character comprises a radical, wherein the secondary sound is a sound made when the radical is spoken.

29. The computer-readable medium of claim 28 wherein the additional multi-byte characters comprise a radical, and wherein the step of accessing the mapping to obtain a secondary sound includes determining whether the radical of at least one of the additional multi-byte characters is equivalent to the radical of the multi-byte character, and when it is determined that the radical of the at least one of the additional multi-byte characters is equivalent to the radical of the multi-byte character, defining the secondary sound such that the secondary sound distinguishes the multi-byte character from the at least one additional multi-byte character.

30. A computer-readable medium containing instructions for controlling a device to unambiguously output sound via a plurality of audio channels to a user, by performing the steps of:

outputting on a first audio channel a primary sound attempting to convey a single meaning to the user, the primary sound being associated with a plurality of meanings; and outputting on a second audio channel a secondary sound at substantially a same time as the primary sound is output to disambiguate the primary sound to enable the user to identify the single meaning.

31. The computer-readable medium of claim 30 wherein the primary sound represents phonetics for an element of grammar of a language and wherein the secondary sound is a usage of the element of grammar to allow the user to identify the element of grammar from context of the usage.

32. The computer-readable medium of claim 31 wherein the usage is a phrase containing the element of grammar and at least one additional element of grammar.

33. The computer-readable medium of claim 30 wherein the element of grammar has a root with a meaning and wherein the secondary sound is a sound descriptive of the meaning of the root.

34. The computer-readable medium of claim 30 wherein the primary sound represents phonetics for an element of grammar of a language and wherein the secondary sound is phonetics for a root of the element of grammar.

35. A computer-readable medium containing instructions for controlling a computer system to audibly play elements of grammar of a language contained in a file, by performing the steps of:

reading the file to obtain the elements of grammar, each element of grammar having a meaning and a pronunciation; and audibly playing sounds, other than the pronunciations, that are descriptive of the meanings of the elements of grammar, wherein the sounds do not convey visual characteristics of the elements of grammar.

36. A method for outputting elements of grammar in a computer system having the elements of grammar, each element of grammar having a pronunciation, comprising the steps of:

for each of the elements of grammar, outputting the element of grammar to a user; and audibly outputting a sound other than the pronunciation of the element of the grammar that conveys additional meaning of the element of grammar to the user to enable the user to better understand the element of grammar.

37. A method for outputting elements of grammar in a computer system having the elements of grammar, comprising the steps of:

for each of the elements of grammar, outputting the element of grammar to a user; and audibly outputting a sound that conveys additional meaning of the element of grammar to the user to enable the user to better understand the element of grammar wherein the computer system has a Braille I/O device, and wherein the step of outputting the element of grammar includes outputting the element of grammar on the Braille I/O device.

38. The method of claim 36 wherein the computer system has a video display and wherein the step of outputting the element of grammar includes outputting the element of grammar on the video display.

39. The method of claim 36 wherein the computer system has a speaker and wherein the step of outputting the element of grammar includes audibly outputting the element of grammar on the speaker.

40. The method of claim 36 wherein the step of outputting the element of grammar ambiguously identifies the element of grammar to the user and wherein the step of audibly outputting a sound includes audibly outputting the sound to enable the user to unambiguously identify the element of grammar.

41. A computer-readable medium containing instructions for controlling a computer system to output elements of grammar, each element of grammar having a pronunciation, by performing the steps of:

for each of the elements of grammar, outputting the element of grammar to a user; and audibly outputting a sound other than the pronunciation of the element of grammar that conveys additional meaning of the element of grammar to the user to enable the user to better understand the element of grammar.

* * * * *